United States Patent [19]

Isobe

[11] Patent Number: 4,519,864

[45] Date of Patent: May 28, 1985

[54] METHOD OF MAKING A PAPER PATTERN FOR DYEING

[76] Inventor: Mineo Isobe, No. 783, Sansho-cho, Suzuka, Mie, Japan

[21] Appl. No.: 512,815

[22] Filed: Jul. 11, 1983

[30] Foreign Application Priority Data

Jul. 14, 1982 [JP] Japan ................................ 57-122369
Sep. 14, 1982 [JP] Japan ................................ 57-160254

[51] Int. Cl.[3] ................................................ B32B 31/18

[52] U.S. Cl. .................................... 156/248; 156/267; 156/268; 156/344

[58] Field of Search ............... 156/248, 251, 268, 344, 156/247, 267, 270, 584, 579, 515

[56] References Cited

U.S. PATENT DOCUMENTS 3,673,030 6/1972 Blanc de la Naulte ............. 156/268
4,388,134 6/1983 Long et al. .......................... 156/248

*Primary Examiner*—Caleb Weston

*Attorney, Agent, or Firm*—Jones, Tullar & Cooper

[57] ABSTRACT

A method of making a paper pattern for dyeing by the use of a paper pattern material comprising a screen and a fusible sheet material bonded thereon, said sheet material being less resistant to heat than the screen, which comprises applying the blunt edge of a blade heated to a temperature slightly lower than the fusing temperature of the sheet material to the surface of the sheet material along the profile of the pattern of the prototype to cut only the sheet material by the cooperation of pressing and softening with the blade edge, or applying the tip of a pointed rod-like tool heated to a temperature higher than the melting temperature of the sheet material and lower than the heat-resistant temperature of the screen to the surface of the sheet material along the profile of the pattern of the prototype to cut only the sheet material by melting, followed by peeling off from the screen the cut portion of the sheet material corresponding to the profile.

2 Claims, 2 Drawing Figures

METHOD OF MAKING A PAPER PATTERN FOR DYEING

Figure 1:
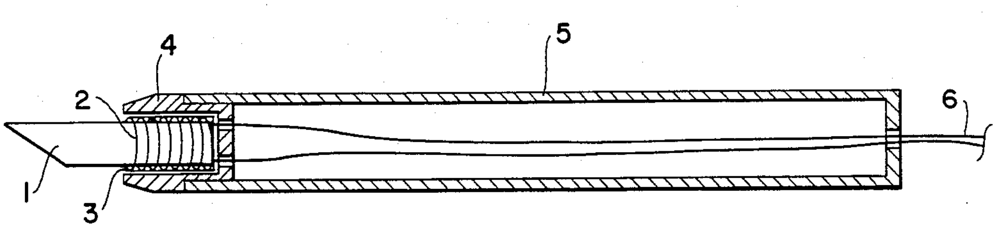

The present invention relates to a method of making a paper pattern for dyeing and an instrument to be used therefor.

As to the method for making a paper pattern for dyeing, there are known a hand carving method using a carving knife, a photoengraving method using a photosensitive resin, a perforating method applying an infrared ray onto a thermosensitive film, etc. The photoengraving method and the perforating method are carried out with a mechanical operation but require the use of a prototype to be prepared by tracing the original for each color. This tracing work takes a considerable time, which is sometimes longer than the time for hand carving. On the other hand, the hand carving method is a traditional technique, for which a skilled operation is required.

This invention provides a method of making a paper pattern efficiently without requiring any special skill by utilization of the characteristics of traditional hand carving procedure.

The screen (or gauze) lined pattern making as usually adopted in the conventional hand carving method comprises carving a pattern on a paper pattern material by openwork with bridges, bonding a sheet of lining paper onto the reverse surface of the openwork-carved paper pattern material, cutting out the above bridges, applying a screen to the whole surface of the resulting paper pattern material and peeling off the lining paper from the resultant paper pattern material.

Different from the conventional method as stated above, this invention uses the paper pattern material on which the pattern is to be carved by openwork is previously lined with a screen so that in practising openwork, the screen is maintained without damage, and the formation of bridges is entirely unnecessary. Thus, the paper pattern material to be used in this invention comprises a screen and a fusible sheet material bonded thereon, the sheet material being less resistant to heat than the screen.

According to this invention, the blunt edge of a blade heated to a temperature slightly lower (e.g. 1° to 5° C.) than the fusing temperature of the sheet material is applied to the surface of the sheet material in the paper pattern material along the pattern profile of the prototype to cut only the sheet material by the cooperation of pressing and softening with the blade edge, followed by peeling off from the screen the cut portion of the sheet material corresponding to the profile, whereby a paper pattern for dyeing is obtained.

The paper pattern material to be used in the present invention comprises, as described above, a screen and a sheet material bonded thereon. The sheet material is required to be fusible with heat and less resistant to heat than the screen. Specific examples of the sheet material are films of various resins (e.g. polyethylene, polypropylene, polyvinyl chloride, polystyrene), synthetic papers, non-penetrative non-woven cloth such as "Tiebeck" manufactured by DuPont, etc. The thickness of the sheet material may be usually from 50 to 300 microns.

The screen may be the one made of any material having a higher heat resistance than the sheet material such as synthetic fibers (e.g. polyesters, polyamides, "Kainol" made by Nippon Kainol, "Cornex" made by Teijin, "Parnel" made by Mitsubishi Rayon), natural fibers (e.g. silk, cotton) and metals (e.g. iron). Also, cloth or paper which has a higher heat-resistance and a better dye and pigment penetrability than the sheet material may be used.

Bonding of the sheet material onto the screen may be carried out in a conventional manner, for instance, as described in Japanese Patent Publication Nos. 9324/1976, 9325/1976, 13045/1976, 45395/1980, etc. That is to say, the sheet material and the screen may be bonded together by the aid of an adhesive, for instance, of polyvinyl acetate emulsion or vinylidene chloride resin latex to such an extent that the bonded material is usable as a paper pattern material without any trouble and can be partially separated by peeling without any difficulty.

Drawing of the pattern profile on the paper pattern material may be carried out in a conventional manner. For example, as frequently adopted in the hand carving method, the paper pattern material and the prototype may be laid together with intervention of a carbon paper therebetween, followed by copying. It is also practical to prepare from the prototype a secondary master sheet having only a pattern profile by the perforating technique with infrared ray irradiation and print said profile onto the paper pattern material using the secondary master sheet. When the sheet material is either transparent or translucent, the prototype and the paper pattern material may be laid together, and the pattern profile may be drawn by tracing on the paper pattern profile material. In this case, the subsequent work may be done without tracing.

In order to carry out openwork on the paper pattern material provided with description of the pattern profile, a tool as shown in FIG. 1 of the accompanying drawing may be used. In FIG. 1, a metal blade 1 required to have a blunt cutting edge. Namely, in the ordinary condition of using, the metal blade should not have such sharpness as causing the ready cutting of the sheet material and the screen. It should have such sharpness as to cause the cutting of the sheet material due to pressure by application of a very strong force. The base part of the metal blade 1 is wound and coiled by a nickel-chromium wire 2 with intervention of an insulating paper 3. Said coiled part is fixed with a heat-insulating insulator 4 (e.g. ceramic insulator). The insulator 4 is fixed to a tubular holder 5 made of, for instance, bakelite. The lead-out line 6 of the nickel-chromium wire 2 is drawn outside through the inside of the holder 5 and connected with a power source, when desired, mediated by a transformer (not shown) for adjusting the heating temperature of the metal blade 1. The heating temperature may be slightly lower than the fusing temperature of the sheet material. For example, in the case of the sheet material being made of the resin as exemplified hereinabove, the heating temperature may be within a range of 80° to 110° C.

When the blade edge of the tool under heating is applied to the surface of the sheet material, the sheet material which is not easily cut by the sharpness of the blade becomes soft under heating and can be readily cut. Since the sheet material is cut not by its fusion only but by the cooperation of pressing and fusing, the cut portion is sharply finished. The screen has a higher heat resistance than the sheet material and therefore does not sustain any undesirable effect by the heat retained in the blade nor sustain any damage by the blade.

When the above tool under heating is applied to the paper pattern material and the blade is moved along the profile of the pattern drawn on the sheet material, only the sheet material of the profiled area is cut. Then, the cut portion of the sheet material corresponding to the profile is peeled off with a suitable instrument (e.g., pincette) so that the desired openwork is completed. The remaining sheet material is supported in adhesion by the screen, and therefore bridges as required in the conventional hand carving method are no more necessary.

As stated above, the cut portion of the sheet material is usually finished into a sharp edge as in the traditional hand carving method. However, because of the use of the blade, the cutting work of the sheet material correponding to the curve portion of small or minute profiles is sometimes difficult. In this case, the tip of a pointed rod-like tool, as shown in FIG. 2, heated to a temperature higher than the fusing temperature of the sheet material and lower than the heat resistant temperature of the screen may be used in place of the tool as shown in FIG. 1.

Figure 2:
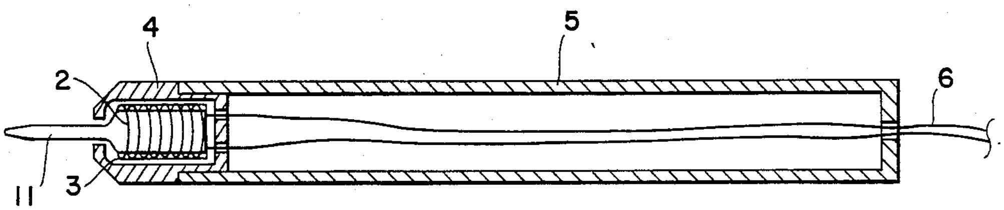

In FIG. 2, 11 indicates a pointed tipped metal rod. The sharpness and the size of the tip portion may be appropriately determined depending upon the cutting width of the sheet material. When the cutting width is narrow, the use of a fine and sharp tip is more advantageous. Other numerals in FIG. 2 have the same significances as in FIG. 1. The heating temperature for the metal rod 1 may be the one at which the sheet material is fusible. In the case of the sheet material being made of a resin as exemplified above, the heating temperature may be usually from 85° to 160° C. Thus, the screen may be made of any material which does not sustain any unfavorable effect by heat in the above temperature range.

When the tool as above is applied to the surface of the sheet material of the paper pattern material under heating, the sheet material is fused by the metal rod and easily cut. Namely, the tool is applied to the paper pattern material under heating, and the metal rod is moved along the profile of the pattern drawn on the sheet material, whereby only the sheet material of the profile portion is cut. Thereafter, the sheet material is peeled off with a suitable instrument (e.g. pincette) to obtain the desired openwork. Since the sheet material and the metal rod are contacted at a point, the cutting work of the sheet material can be readily accomplished even at the curve portion of small or minute profiles. Owing to the fusion cutting, the sharpness of the cut portion of the sheet material is lowered in comparison with the case using the tool as shown in FIG. 1. Consideration may be thus made to use the tools as shown in FIGS. 1 and 2 in appropriate combination. The screen has a higher heat resistance than the sheet material and does not sustain any ill effect by the heated metal rod.

The present invention will be illustrated more in detail by the following Examples.

EXAMPLE 1

A non-transparent polystyrene sheet having a thickness of 100 microns and a polyester screen (30 denier) of #240 in texture were bonded together using a liquid adhesive comprising a polyvinyl acetate emulsion ("BOND KF120" made by Konishi Gisuke Shoten) and methanol in a weight ratio of 1:2 in an amount of 7 grams per m$^2$. On the thus produced paper pattern material, a carbon paper was laid, and a prototype was placed thereon to trace the profile of the pattern. Then, a tool as shown in FIG. 1 was applied to the profile of the pattern on the surface of the polystyrene sheet of the paper pattern material at a blade temperature of 85° to 90° C. Thereafter, the portion of the polystyrene sheet corresponding to the cut profile was peeled off with a pincette to obtain the desired paper pattern.

In the same manner as above but using a transparent polypropylene sheet instead of the polystyrene sheet, laying a prototype on the paper pattern material and seeing through the profile of the pattern without tracing, and adjusting the blade temperature of the tool at 95° to 105° C., there was obtained a paper pattern.

EXAMPLE 2

A non-transparent polystyrene sheet having a thickness of 100 microns and a polyester screen (30 denier) of #240 in texture were bonded together using a liquid adhesive comprising a polyvinyl acetate emulsion ("BOND KF120" made by Konishi Gisuke Shoten) and methanol in a weight ratio of 1:2 in an amount of 7 g per m$^2$. On the thus produced paper pattern material, a carbon paper was laid, and a prototype was placed thereon to trace the profile of the pattern. Then, a tool as shown in FIG. 2 was applied to the profile of the pattern on the surface of the polystyrene sheet of the paper pattern material at a metal rod temperature of 90° to 120° C. Thereafter, the portion of the polystyrene sheet corresponding to the cut profile was peeled off with a pincette to obtain the desired paper pattern.

In the same manner as above but using a transparent polypropylene sheet instead of the polystyrene sheet, laying a prototype on the paper pattern material and seeing through the profile of the pattern without tracing, and adjusting the metal rod temperature of the tool at 100° to 130° C., there was obtained a paper pattern.

What is claimed is:

1. A method of making a paper pattern for dyeing by the use of a paper pattern material comprising a screen and a fusible sheet material bonded thereon, said sheet material being less resistant to heat than the screen, which comprises the steps of:

forming a profile of the pattern of a prototype on the sheet material;

applying the blunt edge of a blade heated to a temperature slightly lower than the fusing temperature of the sheet material to the surface of the sheet material along the profile of the pattern of the prototype;

cutting only the sheet material by the cooperation of pressing and softening with the blade edge; and peeling off from the screen cut portion of the sheet material corresponding to the profile.

2. A method of making a paper pattern for dyeing by the use of a paper pattern material comprising a screen and a fusible sheet material bonded thereon, said sheet material being less resistant to heat than the screen, which comprises the steps of:

forming a profile of the pattern of a prototype on the sheet material;

applying the tip of a pointed rod-like tool heated to a temperature higher than the melting temperature of the sheet material and lower than the heat-resistant temperature of the screen to the surface of the sheet material along the profile of the pattern of the prototype;

cutting only the sheet material by melting; and peeling off from the screen the cut portion of the sheet material corresponding to the profile.

* * * * *